United States Patent [19]

Yamada et al.

[11] Patent Number: 4,840,466

[45] Date of Patent: Jun. 20, 1989

[54] CHANGEABLE MAGNIFICATION OPTICAL SYSTEM

[75] Inventors: Yasuyuki Yamada, Tokyo; Isao Nakazawa, Kanagawa, both of Japan

[73] Assignee: Canon Kabushiki Kaisha, Tokyo, Japan

[21] Appl. No.: 872,138

[22] Filed: Jun. 9, 1986

[30] Foreign Application Priority Data

Jun. 10, 1985 [JP] Japan .................................. 60-125798

[51] Int. Cl.$^4$ ...................... G02B 15/02; G02B 17/00; G03B 15/00; G03B 1/18
[52] U.S. Cl. .................................... 350/422; 350/445; 354/195.12; 354/150
[58] Field of Search ............... 350/422, 445, 520, 247, 350/254, 557, 559, 561; 354/195.1, 195.12, 150, 151

[56] References Cited

U.S. PATENT DOCUMENTS

| | | | |
|---|---|---|---|
| 3,990,778 | 11/1976 | Magee et al. | 350/541 |
| 4,564,278 | 1/1986 | Ohmura | 354/195.12 |
| 4,589,748 | 5/1986 | Ohmura | 354/195.12 |
| 4,609,270 | 9/1986 | Kohno et al. | 354/195.12 |

*Primary Examiner*—Bruce Y. Arnold
*Assistant Examiner*—Ronald M. Kachmarik
*Attorney, Agent, or Firm*—Fitzpatrick, Cella, Harper & Scinto

[57] ABSTRACT

An optical system of changeable magnification comprising a master lens arranged normally in axial alignment to an image receptor to be switchable to another light path which includes a rear converter, and a reflection mirror arranged so that when the master lens is switched from the first to the second light path, the light emerging from the converter is directed to the image receptor, while blocking the first light path off the image receptor, thereby the image magnification is changed from one value to another.

25 Claims, 6 Drawing Sheets

A general object of the present invention is to provide a changeable magnification optical system of high magnification change ratio with a minimum of the bulk and size.

CHANGEABLE MAGNIFICATION OPTICAL SYSTEM

BACKGROUND OF THE INVENTION

1. Field of the Invention:

This invention relates to optical systems of changeable magnification, and more particularly to such optical systems in which the image magnification is changed between different values by switching one of the constituent optical units between parallel light paths in cooperation with a path selector.

2. Description of the Related Art:

A wide variety of changeable magnification optical systems capable of selectively employing two lens arrangements for first and second image magnifications have been proposed. Particularly the selection method that is to releasably attach an auxiliary optical unit to either the front or the rear of a master optical unit to change the focal length of the entire system, or the so-called attachment type, because of its operating mechanism being simple in structure, has found many uses in photographic cameras and SV cameras. When the auxiliary optical unit was used as the front attachment, however, its diameter had to be very large. So, the size of the entire lens system tended to increase. For the rear attachment, though its diameter was smaller as compared with the front attachment, the number of lens elements had to be increased, or otherwise good correction of aberrations would have been difficult to perform. Thus, the physical length tended to increase. A common disadvantage of the front and rear attachments was that whenever necessity arose to change the focal length, the auxiliary optical unit had to be either detached or attached or interchanged with another. Because the swiftness to a shutter chance was very poor, snapshots were difficult to take.

In the field of cameras using 110 size film, it has been known to provide a changeable magnification optical system in which the auxiliary optical unit is arranged to slidingly move into and retract from axial alignment with the master optical unit at the front thereof when the image magnification is changed. There has been another proposal in which two lens systems, or the standard and telephoto lenses, are positioned stationary in parallel, and selectively operated by a movable mirror, in Japanese Patent Publication No. SHO 58-38778. The use of such a switch type in the design of changeable magnification optical systems enables a desired decrease in the bulk and size of the entire system to be relatively easily achieved. To focus the first changeable magnification optical system of the switch type, however, regardless of whether the master lens is moved alone, or along with the auxiliary lens, the total focusing movement is caused to differ with different focal length settings. This drawback was also encountered with the second changeable magnification optical system proposed in Japanese Patent Publication No. SHO 58-38778, as the standard and telephoto lenses had different total focusing movements from each other.

This implies that in application of the switch type to auto-focus cameras, for example the operating mechanism must be constructed so as to differentiate the speed of focusing movement of the lens system with different focal length settings, and, therefore that the complexity of the structure of the internal mechanisms of the camera is increased objectionably.

SUMMARY OF THE INVENTION

A general object of the present invention is to provide a changeable magnification optical system of high magnification change ratio with a minimum of the bulk and size.

A concomitant object is to provide a changeable magnification optical system with an operating mechanism of very simple form owing to a feature that the total focusing movement is maintained constant against change of the image magnification.

BRIEF DESCRIPTION OF THE DRAWINGS

FIGS. 8 and 10 are graphic representations of the aberrations of the lens of FIGS. 7 and 8.

DETAILED DESCRIPTION OF THE PREFERRED EMBODIMENTS

Figure 1A:
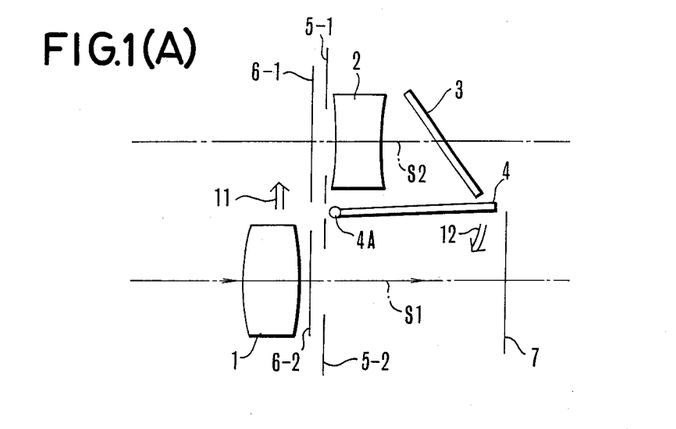
FIGS. 1(A) and 1(B) are schematic views of an embodiment of the optical system according to the present invention.
Figure 1B:
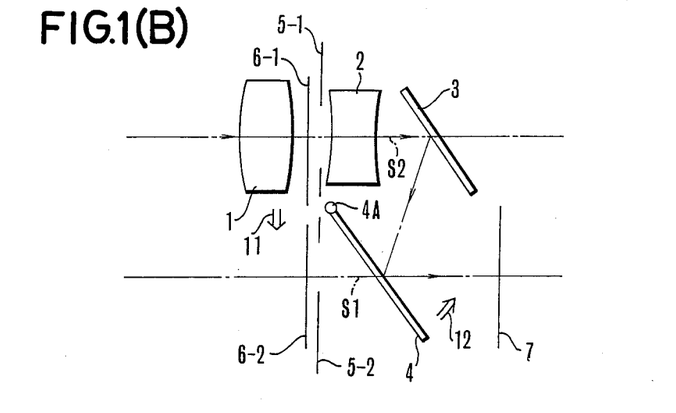

FIGS. 1(A) and 1(B) are schematic views of one embodiment of the optical system according to the invention. FIG. 1(A) illustrates a first optical arrangement of, for example, the standard image magnification, and FIG. 1(B) illustrates a second optical arrangement of, for example, the telephoto image magnification. In FIGS. 1(A) and 1(B), a master optical unit 1 of positive power in movable in a direction indicated by an arrow 11. An auxiliary optical unit of negative power 2 is held stationary. 3 is a fixed mirror; and 4 is a mirror pivotable about a shaft 4A, its directions of movement being indicated by arrows 12; 5-1 and 5-2 each are a diaphragm; 6-1 and 6-2 each are a shutter; 7 is a photosensitive surface of either silver halide film or a solid state image pickup element; S1 and S2 are respectively first and second optical axes.

In the standard focal length setting of FIG. 1(A), the movable mirrow 4 is retracted from the effective light beam of the master optical unit 1, and the shutter 6-1 is closed. Light from an object to be photographed is focused directly on the photosensitive surface 7 by the master optical unit 1 and focusing is performed by moving the master optical unit 1 along the optical axis S1.

In the telephoto focal length setting of FIG. 1(B), the master optical unit 1 is aligned with the auxiliary optical unit 2 on the optical axis S2 at the front thereof been moved in the direction of the arrow 11 from the position of FIG. 1(A), and the movable mirrow 4 is turned about the shaft 4A in the direction of the arrow 12 of FIG. 1(A) to such a position that the axis of the light beam from the fixed mirror 3 is reflected to the center of the area of a picture frame in the surface 7 and the shutter 6-2 is closed. In this figure, light from the object passes through the master optical unit 1 and the auxiliary optical unit 2 and is reflected from the fixed mirror 3 and the movable mirror 4 to form an image of the object on the photosensitive surface 7. Focusing is performed similarly to the standard focal length setting by moving the master optical unit 1 along the optical axis S2.

The use of the same unit or the master optical unit in focusing at both standard and telephoto focal length settings enables the total focusing movements in the standard and telephoto focal length settings to be equalized, thus permitting the focusing control mechanism to be constructed in a simple form.

For note, in this embodiment, the method of changing the position of the movable mirror 4 is not limited to the pivotal one, and may be the slide one instead. Additionally, an optical path selecting means which may take the form of a movable or tiltable mirror may be arranged in a position of convergence of the optical paths.

Also, another axially optical unit may be provided on the first optical axis S1, constituting part of the first optical arrangement.

Figure 2:
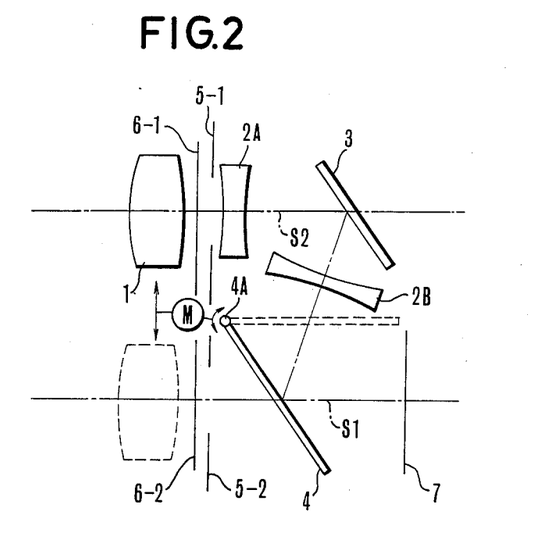
FIG. 2 is a schematic view of another embodiment of the optical system according to the invention.

FIG. 2 is a schematic view of another embodiment of the optical system according to the present invention. In this figure, dashed lines illustrate a first optical arrangement of the standard magnifying power, and solid lines illustrate a second optical arrangement of the telephoto magnifying power. Also, the same reference characters have been employed to denote parts similar to those shown in FIGS. 1(A) and 1(B).

In this embodiment, the auxiliary optical unit is divided into two parts 2A and 2B which are positioned on either side of an incident normal of the fixed mirror 3. As this allows for proper distribution of the negative power over the auxiliary optical unit, it is made possible to achieve good correction of aberrations. M is an interlinking mechanism by which the shifting of the main optical unit 1 is coordinated with the tilting of the movable mirror.

For note, in the embodiments shown in FIGS. 1 and 2, the second optical arrangement may be modified so that the auxiliary optical unit is moved partly or as a whole to make close-up shooting, or the so-called macro photography.

Next, numerical examples of the invention are shown. In the numerical examples, Ri is the radius of curvature of the i-th lens surface counting from the front, Di is the i-th lens thickness or air separation counting from the front. Ni and $\nu$i are respectively the refractive index and Abbe number of the glass of the i-th lens element counting from the front.

Numerical Example 1
The master optical unit:
F = 100   FNO = 1:2.8   $2\omega$ = 55.42°

| R1 = 33.30 | D1 = 11.25 | N1 = 1.77250 | $\nu$1 = 49.6 |
|---|---|---|---|
| R2 = 103.04 | D2 = 2.61 | | |
| R3 = −167.04 | D3 = 4.25 | N2 = 1.72151 | $\nu$2 = 29.2 |
| R4 = 30.74 | D4 = 3.57 | | |
| R5 = 298.96 | D5 = 1.86 | N3 = 1.58144 | $\nu$3 = 40.7 |
| R6 = 34.29 | D6 = 9.00 | N4 = 1.80610 | $\nu$4 = 40.9 |
| R7 = −78.09 | D7 = 3.57 | | |
| R8 = Stop | | | | b.f = 75.26

The master optical unit and the auxiliary optical unit in combination:

F = 200   FNO = 1:5.6   $2\omega$ = 29.43°

| R1 = 33.30 | D1 = 11.25 | N1 = 1.77250 | $\nu$1 = 49.6 |
|---|---|---|---|
| R2 = 103.04 | D2 = 2.61 | | |
| R3 = −167.04 | D3 = 4.25 | N2 = 1.72151 | $\nu$2 = 29.2 |

-continued
F = 200   FNO = 1:5.6   $2\omega$ = 29.43°

| R4 = 30.74 | D4 = 3.57 | | |
|---|---|---|---|
| R5 = 298.96 | D5 = 1.86 | N3 = 1.58144 | $\nu$3 = 40.7 |
| R6 = 34.29 | D6 = 9.00 | N4 = 1.80610 | $\nu$4 = 40.9 |
| R7 = −78.09 | D7 = 3.57 | | |
| R8 = Stop | D8 = 5.36 | | |
| R9 = −334.71 | D9 = 5.93 | N5 = 1.69895 | $\nu$5 = 30.1 |
| R10 = −35.65 | D10 = 2.64 | | |
| R11 = −31.08 | D11 = 2.18 | N6 = 1.88300 | $\nu$6 = 40.8 |
| R12 = 92.89 | D12 = 0.29 | | |
| R13 = 57.71 | D13 = 7.46 | N7 = 1.53256 | $\nu$7 = 45.9 |
| R14 = −349.81 | | | | b.f = 117.50

Numerical Example 2
The master optical unit:
F = 100   FNO = 1:2.8   $2\omega$ = 63.00°

| R1 = 47.16 | D1 = 5.00 | N1 = 1.51633 | $\nu$1 = 64.1 |
|---|---|---|---|
| R2 = 30.25 | D2 = 15.95 | | |
| R3 = 49.47 | D3 = 16.67 | N2 = 1.80400 | $\nu$2 = 46.6 |
| R4 = −73.60 | D4 = 5.36 | N3 = 1.60717 | $\nu$3 = 40.3 |
| R5 = −641.62 | D5 = 2.67 | | |
| R6 = −102.27 | D6 = 4.29 | N4 = 1.74077 | $\nu$4 = 27.8 |
| R7 = 58.87 | D7 = 3.54 | | |
| R8 = −209.65 | D8 = 16.67 | N5 = 1.80400 | $\nu$5 = 46.6 |
| R9 = −47.63 | D9 = 4.17 | | |
| R10 = Stop | | | | b.f = 84.67

The master and auxiliary optical units in combination:

F = 200   FNO = 1:5.6   $2\omega$ = 34.06°

| R1 = 47.16 | D1 = 5.00 | N1 = 1.51633 | $\nu$1 = 64.1 |
|---|---|---|---|
| R2 = 30.25 | D2 = 15.95 | | |
| R3 = 49.47 | D3 = 16.67 | N2 = 1.80400 | $\nu$2 = 46.6 |
| R4 = −73.60 | D4 = 5.36 | N3 = 1.60717 | $\nu$3 = 40.3 |
| R5 = −641.62 | D5 = 2.67 | | |
| R6 = −102.27 | D6 = 4.29 | N4 = 1.74077 | $\nu$4 = 27.8 |
| R7 = 58.87 | D7 = 3.54 | | |
| R8 = −209.65 | D8 = 16.67 | N5 = 1.80400 | $\nu$5 = 46.6 |
| R9 = −47.63 | D9 = 4.17 | | |
| R10 = Stop | D10 = 6.25 | | |
| R11 = −221.73 | D11 = 7.92 | N6 = 1.68893 | $\nu$6 = 31.1 |
| R12 = −45.20 | D12 = 4.37 | | |
| R13 = −38.74 | D13 = 3.33 | N7 = 1.88300 | $\nu$7 = 40.8 |
| R14 = 144.38 | D14 = 0.42 | | |
| R15 = 80.97 | D15 = 10.42 | N8 = 1.53256 | $\nu$8 = 45.9 |
| R16 = −375.56 | | | | b.f = 126.24

Figure 3:
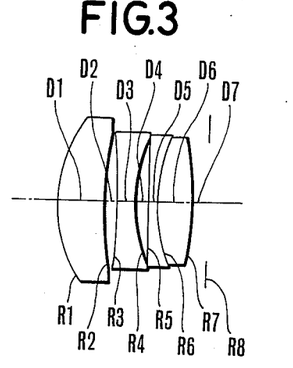
FIGS. 3 and 5 are longitudinal section views of an example 1 of a specific lens of the invention.
Figure 4:
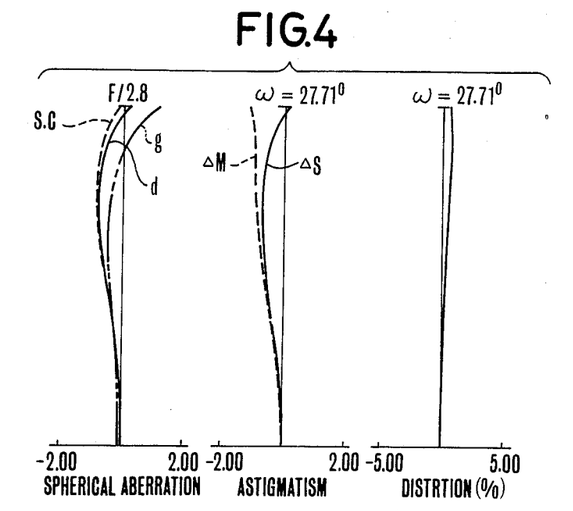
FIGS. 4 and 6 are graphic representations of the aberrations of the lens of FIGS. 3 and 5 in different focal length settings.
Figure 5:
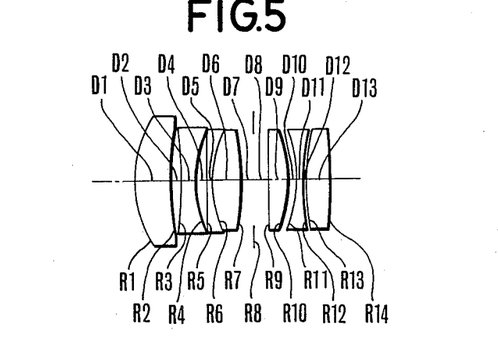
Figure 6:
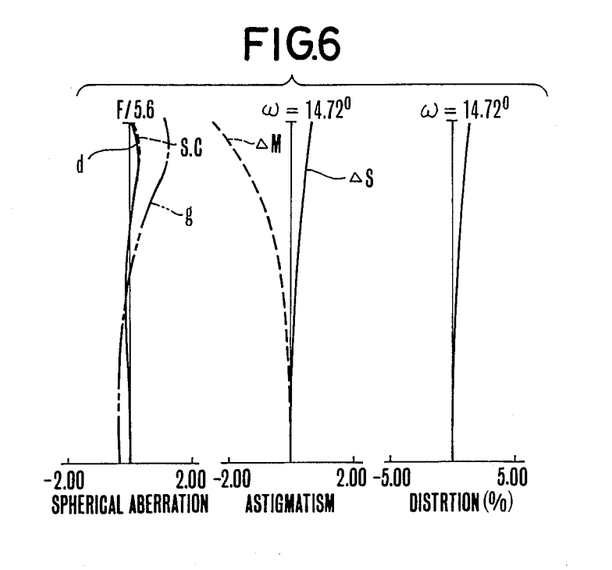

The first specific optical system of the invention when set in the first optical arrangement, or the master optical unit alone, is shown in block form in FIG. 3 and its aberration curves are shown with an object at infinity in FIG. 4, and when set in the second optical arrangement, or the master optical unit plus the auxiliary optical unit, is shown in block form in FIG. 5 and its aberration curves are shown with an object at infinity in FIG. 6.

Figure 7:
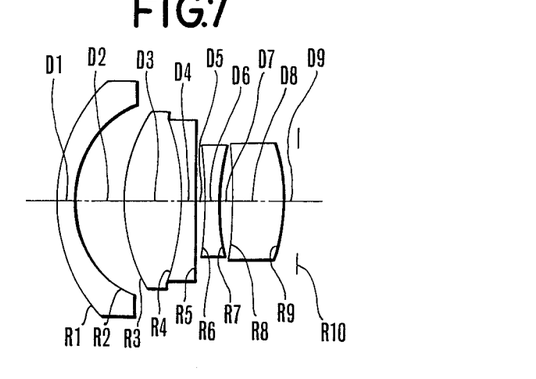
FIGS. 7 and 8 are longitudinal section views of another example 2 of a specific lens of the invention.
Figure 8:
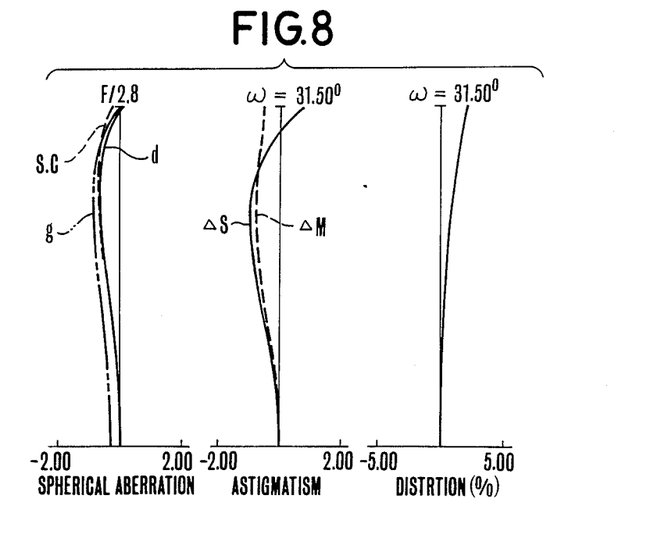
Figure 9:
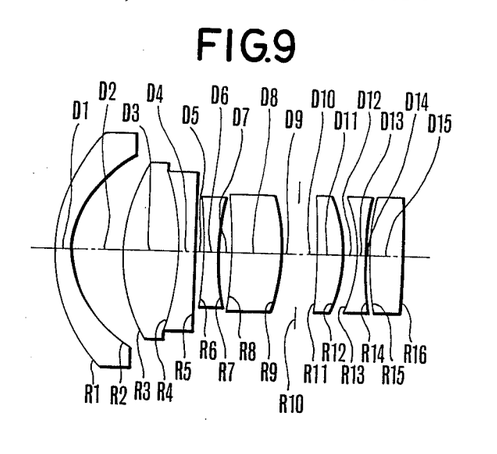
Figure 10:
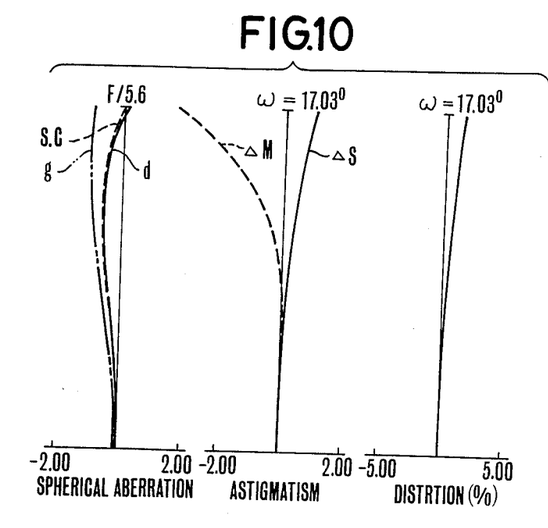

The second specific optical system of the invention when set in the first optical arrangement, or the master optical unit alone, is shown in block form in FIG. 7, and its aberration curves are shown with an object at infinity in FIG. 8, and when set in the second optical arrangement, or the combination of the master and auxiliary optical units, is shown in block form in FIG. 9 and its aberration curves are shown with an object at infinity in FIG. 10.

According to the present invention, the changeable magnification optical system having two optical arrangements selectively operated is made to be focused by the same unit in both arrangements, thereby giving an advantage that as the total focusing movement is maintained constant against change of the image magnification, the operating mechanism can be constructed in very simple form. Particularly when applied to autofocus cameras, a great advantage can be produced.

What is claimed is:

1. A changeable magnification optical system comprising:
    a plurality of optical paths, each of which conducts light from an object to an image receiving surface;
    optical path selecting means for selecting one of said plurality of optical paths;
    switch optical means switchable between said plurality of optical paths for causing the magnification to change in cooperation with selection of the optical path by said optical path selecting means; and
    second optical means arranged in at least one of said plurality of optical paths to receive light transmitted through the first optical means when said first optical means is in one of said optical paths.

2. An optical system according to claim 1, wherein the selection of the optical path by said optical path selecting means is coordinated with the switching of said first optical means.

3. An optical system according to claim 1, wherein when said first optical means is set in one of said optical paths, the first final image magnification by optical means existing on that optical path is different from the second final image magnification by optical means existing on another optical path when said first optical means is set in said another optical path.

4. An optical system according to claim 3, wherein said second final image magnification is the composite image magnification by said first optical means and said second optical means.

5. An optical system according to claim 4, wherein said first optical means has a positive power.

6. An optical system according to claim 4, wherein said second optical means has a negative power.

7. An optical system according to claim 4, wherein said first optical means has a positive power and said second optical means has a negative power.

8. An optical system according to claim 3, wherein said first final image magnification is the image magnification of said first optical means.

9. An optical system according to claim 1, wherein said first optical means is movable along the optical path to effect focusing.

10. An optical system according to claim 1, wherein said optical path selecting means is arranged in a position of convergence of the optical paths.

11. An optical system according to claim 10, wherein said optical path selecting means is a movable mirror.

12. An optical system according to claim 11, wherein said mirror is tiltable.

13. An optical system according to claim 1, wherein said first optical means has a positive power.

14. A changeable magnification optical system comprising:
    a first image forming optical path, and a second image forming optical path partly superimposed on said first image forming optical path;
    movable reflecting means for selecting one of said first and second image forming optical paths;
    first optical means switchable between said first image forming optical path and said second image forming optical path in coordination with the selecting operation of said reflecting means; and
    second optical means arranged in said first image forming optical path, whereby the image magnification differs when said first image forming optical path is selected and when said second image forming optical path is selected and in the first image forming path the light flux is relayed between said first optical means and said second optical means without forming an image.

15. An optical system according to claim 14, wherein said first optical means has a positive power.

16. A changeable magnification optical system comprising:
    a first image forming optical path, and a second image forming optical path partly superimposed on said first image forming optical path;
    movable reflecting means for selecting one of said first and second image forming optical paths;
    first optical means switchable between said first image forming optical path and said second image forming optical path in coordination with the selecting operation of said reflecting means; and
    second optical means arranged in said first image forming optical path, whereby the image magnification differs between when said first image forming optical path is selected and when said second image forming optical path is selected wherein said second optical means has a negative power.

17. An optical system according to claim 16, wherein the distance from said first optical means when set in said first image forming optical path to an image plane is predetermined to be longer than the distance from said first optical means when set in said second image forming optical path to the image plane.

18. An optical system according to claim 16, wherein said first optical means moves along the optical path for focusing purposes.

19. An optical system according to claim 16, wherein said reflecting means is a tiltable mirror, being obliquely positioned with said second image forming optical path when said first optical means is set in said first image forming optical path, and being retracted from said second image forming optical path when said first optical means is set in said second image forming optical path.

20. A camera comprising:
    (a) image receiving means for receiving an image of an object;
    (b) first reflecting means;
    (c) second reflecting means movable between a first position and a second position;
    (d) a first image forming optical path passing through said first and said second reflecting means to said image receiving means when said second reflecting means lies in the first position;
    (e) a second image forming optical path reaching said image receiving means when said second reflecting means lies in the second position;
    (f) movable optical means switchable between said first image forming optical path and said second image forming optical path in response to movement of said reflecting means; and
    (g) stationary optical means provided in siad first image forming optical paths.

21. A camera according to claim 20, wherein when said movable optical means is set in said first image forming optical path, said second reflecting means occupies the first position and, when said movable optical means is set in said second image forming optical path, said second reflecting means occupies the second position.

22. A camera according to claim 20, wherein said movable optical means has a positive power.

23. A camera according to claim 20, wherein said stationary optical means is provided in said first image forming optical path and has a negative power.

24. A camera according to claim 23, wherein said stationary optical means includes positive, negative and positive lenses, respectively.

25. A camera according to claim 20, wherein said moveable optical means along the optical path for focusing purposes.

* * * * *